United States Patent [19]
McCaffrey

[11] Patent Number: 5,137,403
[45] Date of Patent: Aug. 11, 1992

[54] SUPPORT SURFACE AND ADJUSTABLE SECURITY STRAP FOR TRAVELER CART

[75] Inventor: Jeffrey T. McCaffrey, Portland, Oreg.

[73] Assignee: Anthro Corporation, Portland, Oreg.

[21] Appl. No.: 628,410

[22] Filed: Dec. 14, 1990

[51] Int. Cl.⁵ .............................................. B62B 3/04
[52] U.S. Cl. ................................. 410/51; 410/104
[58] Field of Search ............... 410/51, 97, 98, 100, 410/101, 104, 106, 8-11, 74, 75, 105; 24/16 R, 17 A, 269

[56] References Cited

U.S. PATENT DOCUMENTS

| | | | |
|---|---|---|---|
| 1,181,377 | 5/1916 | Powell | 410/97 |
| 2,052,914 | 9/1936 | Williams | 410/105 X |
| 3,112,543 | 12/1963 | Derrickson | 24/16 R X |
| 3,377,666 | 4/1968 | Sherman | 24/16 R |
| 3,713,616 | 1/1973 | Bowers | 410/105 |
| 3,831,976 | 8/1974 | Iden, Sr. | 410/104 |
| 3,972,500 | 8/1976 | Johnson et al. | 410/104 X |
| 4,083,312 | 4/1978 | Holman, Jr. | 410/97 |
| 4,248,558 | 2/1981 | Lechner | 410/104 |
| 4,708,549 | 11/1987 | Jensen | 410/105 |
| 4,826,193 | 5/1989 | Davis | 410/106 X |
| 4,850,769 | 7/1989 | Matthews | 410/105 |
| 4,955,771 | 9/1990 | Bott | 410/104 X |
| 4,992,015 | 2/1991 | Florence | 410/101 X |
| 5,083,726 | 1/1992 | Schum | 410/105 X |

Primary Examiner—Robert J. Spar
Assistant Examiner—William M. Hienz
Attorney, Agent, or Firm—Stoel Rives Boley Jones & Grey

[57] ABSTRACT

A support surface or deck (12), and in particular the upper-most support platform (20), of a traveler or cart (10) securely transports television monitors, audio-visual recording or playback equipment, projectors, or other heavy or bulky articles (14). The support surface includes an adjustable safety strap (20) secured to slidable and lockable anchoring devices (24) in a guide channel (26) recessed in a groove (28) in the support surface. The top surface (34) of the guide channel is flush with the deck. A pair of safety strap anchoring devices (24) enter and slide along the length of the guide channel. Each anchoring device is attached to an opposing end (22) of the safety strap which is looped over to secure or harness the article being transported. Each anchor has a set screw (44) for immobilizing the anchor at any desired position within the guide channel and an eyelet (38) with stem (40) for cinching one end of the safety strap thereto with a single bar slide (54). The safety strap may be formed of more than one sub-strap (56) which may be joined by a variety of devices including a ladder lock (58) including a bar slide (54). The strap may also include a keeper (60) for neatly retaining excess strap.

19 Claims, 3 Drawing Sheets

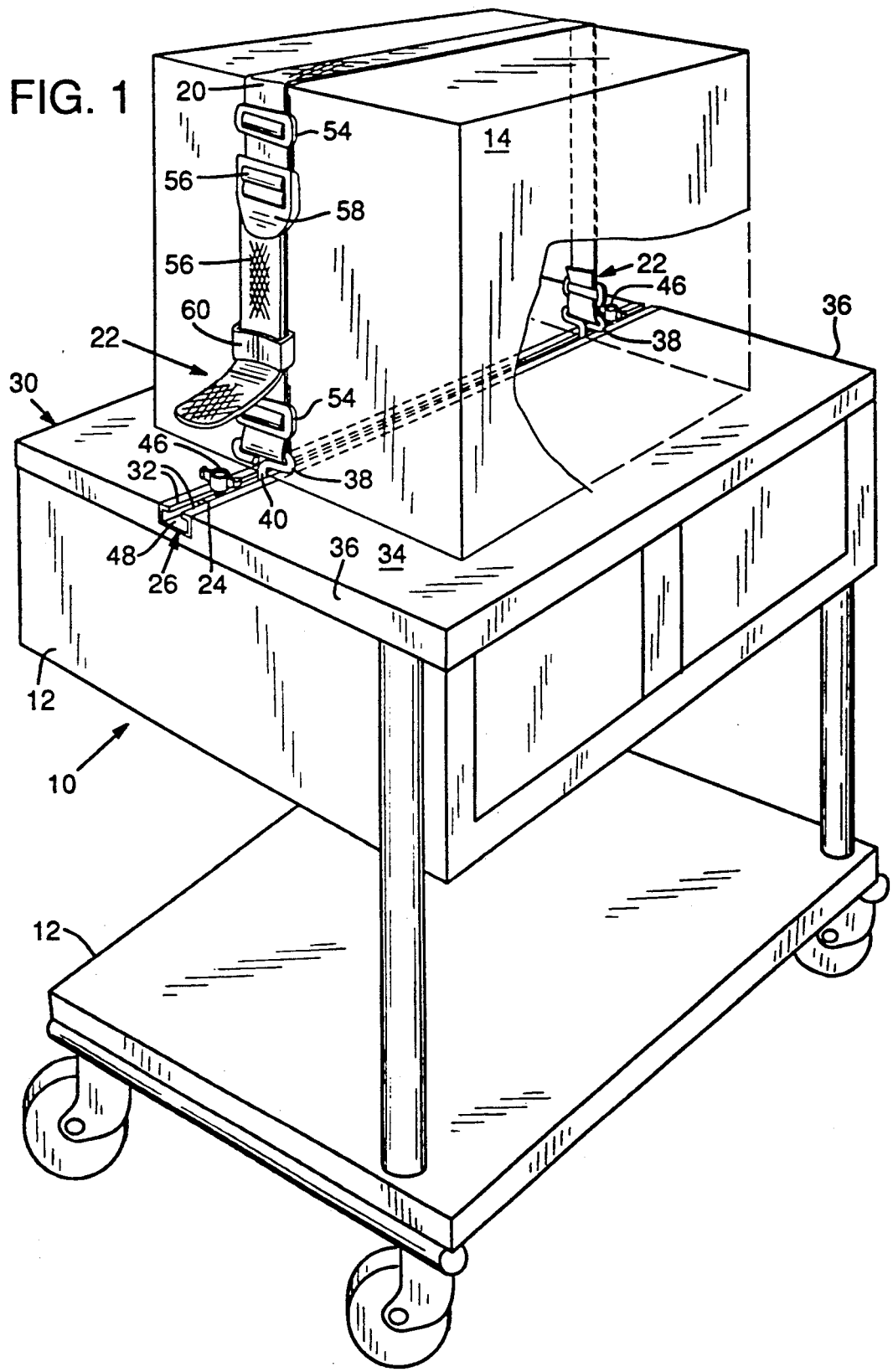

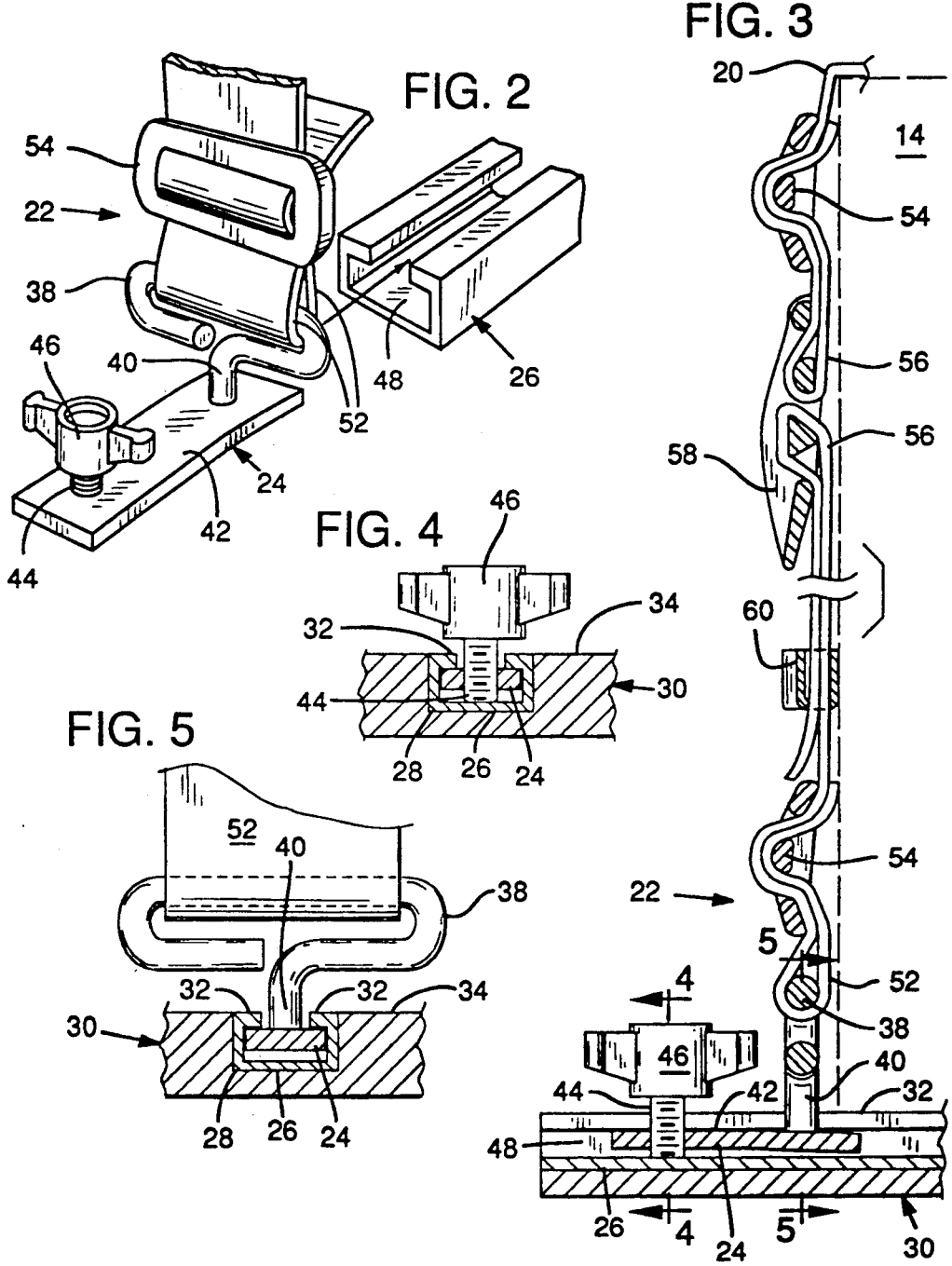

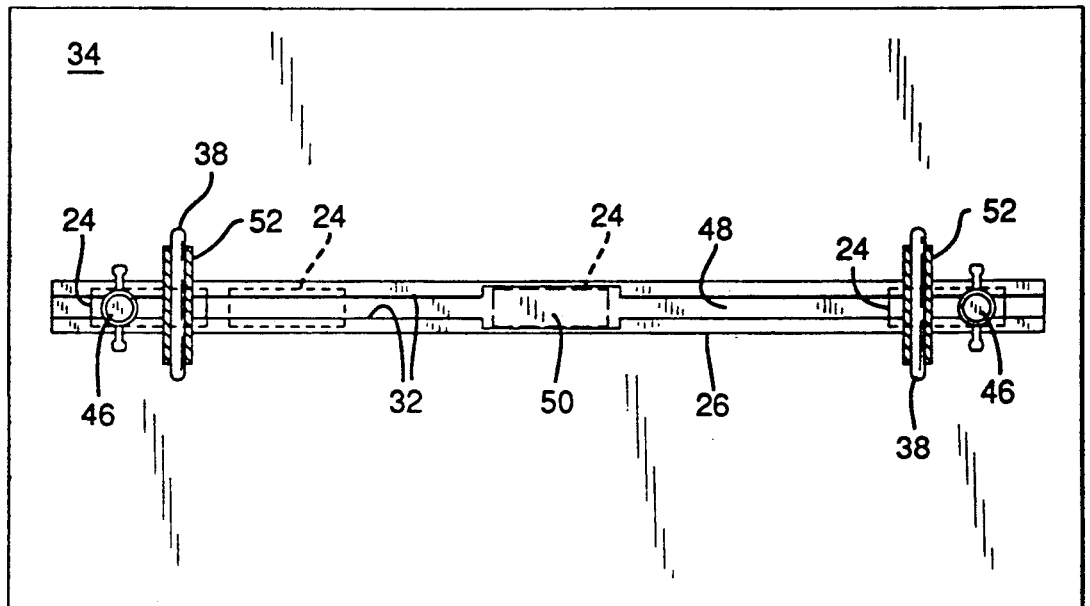
FIG. 6
FIG. 7
FIG. 8
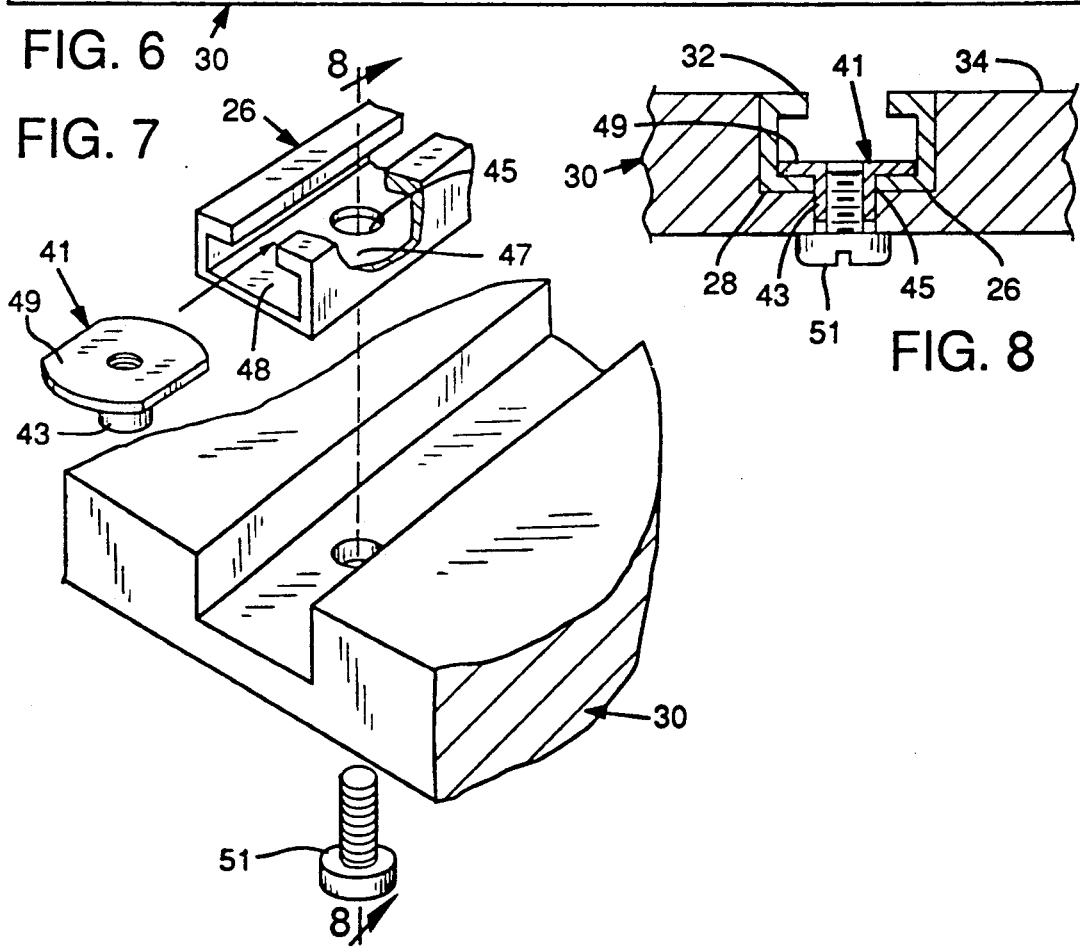

SUPPORT SURFACE AND ADJUSTABLE SECURITY STRAP FOR TRAVELER CART

TECHNICAL FIELD

The present invention relates to mobile carts for transporting audio-visual or other equipment and, in particular, to a support surface and an adjustable safety strap for securely transporting equipment on such a cart.

BACKGROUND OF THE INVENTION

This invention relates to a traveler cart having a support surface or deck suitable for supporting, storing, and transporting electronic equipment. Such carts are used to transport television monitors, audio-visual recording or playback devices, projectors and other materials in many commercial, school and home settings. For example, hospitals use these carts to keep emergency monitoring equipment in mobile readiness.

A typical cart in use today is carried on four swivel wheels, stands approximately four to six feet tall, and has three or more square or rectangular decks or shelves and a top deck. The top deck may have low retaining walls or rails to help stabilize the load, and often has some kind of rubberized pad or other non-skid surface. Alternatively, corner support posts may extend above the deck for this same purpose. Typically, the corner posts or low retaining walls or rails, function as the only structures acting to prevent the equipment carried on the top deck from shifting or toppling.

Transporting expensive audio-visual or other sensitive electronic equipment with such traveler carts heretofore has been at best precarious. Equipment on such carts tends to shift position and to topple. Innovative users of these carts have thought to employ loose belts, thongs and other tethers to either harness or bind the articles being transported to the cart, but these attempts have met with limited success.

Belts or other thongs securing the equipment tend to obstruct access to the controls of the equipment or block access to vital information. Belts and other cinctures are, as a consequence, generally used to harness equipment by attaching the belt to the side margin of the deck surface on one side, drawing the belt up to one side of the article, over and across its top, and then down again to the opposite side margin of the deck surface on the other side. The cincture and the top of the traveler cart thus form a trapezoid. Movement of the article is restricted primarily as a result of the friction created only between the cincture and the top of the article and between the bottom surface of the article and the top surface of the deck. This arrangement has been found inadequate to stabilize many large, top-heavy, or bulky pieces, such as certain television monitors. Moreover, straps drawn from the side margin of the deck surface may obstruct and limit use of the unoccupied portion of the surface.

In response to those shortcomings, creative users of the travelers carts have sought the desired stability by tying down the equipment using binders attached directly to the equipment at several points. But tie-downs too have disadvantages. Electronic equipment is often without securable appendages or recesses necessary to make for easy cinching. Additionally, tie-downs require the use of several discrete ties and are difficult to use and store. Lastly, tie-downs suffer from some of the same problems found with the harnessing cinctures described above. Both tie-downs and cinctures obstruct a portion of the support surface, thereby making it largely unusable. More importantly, neither the tie-downs nor cinctures described provide for the desired degree of immobilization of the article and security against toppling.

SUMMARY OF THE INVENTION

An object of the present invention is, therefore, to provide a mobile utility cart for securely supporting or housing large, heavy, or bulky audio-visual or other equipment.

Another object of this invention is to provide a traveler cart having a support surface or deck which minimizes both shifting and toppling of the audio-visual or other equipment during transport.

A further object of this invention is to provide for fastening equipment to the support surfaces of traveler carts an adjustable safety strap which is sure, adaptable, and easy to use.

Still another object of this invention is to provide for fastening equipment to the support surfaces of traveler carts an apparatus which does not render the remainder of the support surface unusable.

The present invention is a traveler cart having a support surface, deck, or platform suitable for transporting audio-visual, or other heavy or bulky equipment, snugly secured in place by an adjustable safety strap anchored to a guide channel recessed in the support surface.

One or more decks of the traveler cart, and in particular the upper-most support platform, includes a recessed guide channel. The guide channel lies in a groove in the deck and is preferably flush with the deck. The guide channel is preferably the same length as the support surface, but in certain applications could protrude beyond the sides of the deck at either end of the channel.

In a preferred embodiment, a pair of safety strap anchoring devices may enter the guide channel from its distal ends and slide along the length of the guide channel. Each anchoring device is attached to an opposing end of an adjustable safety strap, which may be looped over to secure or harness the article being transported. The anchoring devices may also be slid into proximal abutment with the opposite sides of the article to be transported. When so positioned, there is increased contact of the safety strap to the vertical sides of the article. There may also be contact between the anchoring devices and the article itself, thereby providing an approximate conformal fit of the belt to the article to further brace the article against movement.

Each of the anchoring devices includes a slidelocking thumb screw and a strap-receiving eyelet. The thumb screw functions to lock the anchor in place, assuring taut retention and immobility of the article being transported. The eyelet is cinched to a loop formed of one end of the safety strap to secure the strap to the eyelet.

The safety strap itself may be formed of two or more straps which can be joined by a variety of means including a belt buckle or a ladder lock. The length of any of the straps can be adjusted, in particular by using single bar slides or a ladder lock. A keeper may be attached to the strap for neatly retaining excess strap. A preferred strap is of the webbed type.

It will be appreciated that support platforms suitable for transporting audio-visual or other equipment held securely in place by an adjustable safety strap anchored to a recessed guide channel may be used as a replacement for prior art shelves and support surfaces on prior art traveler carts.

Additional objects and advantages of the present invention will be apparent from the following detailed description of preferred embodiments thereof, which proceeds with reference to the accompanying drawings.

BRIEF DESCRIPTION OF THE DRAWINGS

FIG. 1 is an isometric side elevation view of a preferred traveler cart with a safety strap that secures an article to be transported.

FIG. 2 is an enlarged isometric view of an anchoring device shown in position for insertion into a distal port of the guide channel of the traveler cart of FIG. 1.

FIG. 3 is an enlarged fragmentary frontal view shown partly in cross section of a guide channel with an anchor device.

FIG. 4 is a sectional view taken along lines 4—4 of FIG. 3.

FIG. 5 is a sectional view taken along lines 5—5 of FIG. 3.

FIG. 6 is a plan view of a support surface showing the recessed guide channel including a gateway for inserting a pair of anchor devices into the guide channel.

FIG. 7 is an enlarged fragmentary isometric view of a guide channel shown in position for affixing in a recess in a support surface with a slab nut.

FIG. 8 is a sectional view taken along lines 8—8 of FIG. 7.

DETAILED DESCRIPTION OF PREFERRED EMBODIMENTS

With reference to FIGS. 1-8, a traveler cart 10 includes multiple support surfaces or decks 12 suitable for transporting audio-visual or other equipment 14 secured by an adjustable safety strap 20. Opposed ends 22 of safety strap 20 are secured to anchor devices 24 that are slidable in a guide channel or track extrusion 26 recessed in a groove 28 in support surface 12. Guide channel 26 is affixed in groove 28 by slab nut 41 as shown in FIGS. 7 and 8. Hollow barrel 43 of slab nut 41 passes through opening 45 in bottom surface 47 of guide channel 26. In one preferred embodiment, round head screw 51 is inserted through opening 45 from under support surface 30 into slab nut 41 to affix guide channel 26 in groove 28. In the preferred embodiment the shape of slab nut head 49 prevents it from spinning.

One or more support surfaces 12 of traveler cart 10 may include a recessed guide channel 26 set within groove 28. In the usual case, however, only an uppermost support surface or deck 30 includes a recessed guide channel 26 set within groove 28. The top surface 32 of guide channel 26 is preferably flush with the top surface 34 of support deck 30, as illustrated in FIGS. 1, 4 and 5. In FIG. 1, guide channel 26 is the same length as support deck 30. In alternative embodiments, guide channel 26 may not fully extend to the side margins 36 of support deck 30, or may protrude beyond the side margins 36 in either direction. In one preferred embodiment, guide channel 26 is not exposed at side margins 26 but is covered by side molding. It will be appreciated that multiple parallel guide channels 26 may be included in a single support surface 12.

The ends 22 of safety strap 20 are secured to lockable safety strap anchoring devices or strap fasteners 24 that may selectively slide or lock into place along the length of guide channel 26. Each anchoring device 24 is cinched to an opposing end 22 of length-adjustable safety strap 20 through a strap receiving eyelet 38 on a stem 40 extending from the top surface 42 of anchoring device 24. Safety strap 20 is then looped over, to secure or harness, the article 14 to be transported.

Anchoring device 24 may also be slid into proximal abutment with the opposing vertical sides 16 of article 14 to be transported. When so positioned, there is contact between safety strap 20 along the vertical sides 16 of article 14. There may also be contact between anchoring device 24 and article 14 itself, further bracing article 14 against movement. In one preferred embodiment, strap-receiving eyelet 38 and stem 40 are formed so as to support and grip article 14 to be transported, as illustrated in FIG. 1. Strap receiving eyelet 38 and stem 40 are preferably constructed of a hard metal or a hard, durable plastic. The choice of a rigid material further enhances the article bracing property of anchoring device 24. Eyelet 38 is shaped for ideal cinching to adjustable safety strap 20 and for functioning as a brace to article 14.

Anchoring device 24 includes locking means for arresting its movement within guide channel 26. The locking means preferably includes a set screw 44 for frictional engagement with guide channel 26. Set screw 44 is engaged by turning a thumb screw cap 46, as illustrated in FIG. 3. Thumb screw cap 46 is constructed of metal or hard and durable plastic, and set screw 44 is constructed of metal. When the locking means is not activated, anchoring device 24 remains freely slidable and tends to slide into proximal abutment with opposing, vertical sides 16 of article 14 as the length of safety strap 20 is shortened.

Unless immobilized, anchoring device 24 is free to slide in either direction within guide channel 26. In one embodiment, anchoring device 24 may have a slightly convex upper surface 42 for unobstructed sliding as shown in FIG. 2. Guide channel 26 and anchoring device 24 are preferably constructed of a hard steel or a hard, durable plastic. Preferably, two anchoring devices 24 are positioned along guide channel 26 on opposing sides of article 14 to be transported as shown in FIG. 1.

Anchoring device 24 may enter guide channel 26 from either of its distal ports or ends 48, as shown in FIG. 2, or through a gateway 50 located near the midpoint of guide channel 26 as shown in FIG. 6. A gateway 50 located at about the midpoint of guide channel 26 does not allow an undesired egress for anchoring device 24 during use. Guide channel 26 may include the midpoint gateway 50, irrespective of whether access is provided at distal ports 48 or obstructed by side moldings.

In one preferred embodiment, portions of anchoring device 24 project from guide channel 26, as best shown in FIGS. 3, 4, and 5. Such projections include strap-receiving eyelet 38 on stem 40 and thumb screw cap 46 for engaging set screw 44 to lock or unlock anchoring device 24 within guide channel 26, as shown in FIGS. 3, 4, and 5. The projecting portions of anchoring device 24 are so configured and constructed of a material so as to facilitate bracing article 14 against movement.

In another preferred embodiment, each opposing end 22 of safety strap 20 is cinched to a respective slidable anchoring device 24 through eyelet 38 by a loop 52 foldably formed at the end 22 in safety strap 20 and secured using a single bar slide 54 as shown in FIGS. 1, 2 and 3. Safety strap 20 itself may be formed of two or more sub-straps 56 which may be joined by a bar slide, belt buckle or a ladder lock 58. The length of any of sub-strap 56 may thereby also be adjusted. Safety strap 20 or any sub-strap 56 may also carry a keeper 60 for neatly retaining excess strap. Safety strap 20 or any sub-strap 56 may preferably be a webbing.

It will be obvious to those having skill in the art that many changes may be made to the details of the above-described preferred embodiment of the present invention without departing from the underlying principles thereof. For example, support platform 12 described above may be used as a replacement for prior art shelves and support surfaces, including uppermost deck 30, in conventional transportation carts for audio-visual equipment. The scope of the present invention should be determined, therefore, only by the following claims.

I claim:

1. A traveler cart for securely transporting and supporting articles, comprising:
   a safety strap for harnessing an article to be transported;
   a support surface having a guide channel recessed therein for slidably receiving a lockable anchor member positioned therein, the guide channel having an inner surface and the anchor member having an upper surface that contacts and generally conforms to the shape of the inner surface of the guide channel;
   set screw means attached to the lockable anchor member and extending out of the guide channel for locking the upper surface of the anchor member to the inner surface of the guide channel and thereby locking the anchor member at a selectable position within the guide channel; and
   a post extending from the lockable anchor member out of the channel, connected to an eyelet for adjustably cinching thereto one end of a safety strap.

2. The traveler cart of claim 1 in which the safety strap comprises a plurality of sub-straps.

3. The traveler cart of claim 2 in which at least one of the sub-straps includes a single bar slide for adjusting the sub-strap and a keeper for neatly retaining excess sub-strap.

4. The traveler cart of claim 1 in which the safety strap includes on each end thereof a bar slide for creating a loop to adjustably cinch the safety strap to the eyelet.

5. The traveler cart of claim 1 in which the safety strap further comprises a pair of sub-straps each of which having first and second ends, the first sub-strap including a ladder lock at the first end thereof and the second sub-strap having a single bar slide at the first end thereof, thereby to create a loop to adjustably cinch the second sub-strap to the ladder lock of the first strap.

6. The traveler cart of claim 1 in which the safety strap is a webbed structure.

7. The traveler cart of claim 1 in which the eyelet is configured to brace the article to be transported.

8. A wheeled audiovisual cart for securely transporting and supporting articles, comprising:
   an upper platform having a track extrusion recessed therein flush with the surface of the platform an forming a channel for positioning therein a generally planar anchor member; set screw means attached to the anchor member and extending out of the channel for selectively moving the generally planar anchor member into locked engagement with the track extrusion at a selected position within the track extrusion; and
   attachment means including a stem attached to the anchor member and extending out of the channel for connecting thereto a safety strap that secures an article to be transported.

9. The wheeled audiovisual cart of claim 8 in which the set screw means is manually adjustable and has its axis perpendicular to the anchor member and the attachment means comprises an eyelet on the stem, the stem having its axis perpendicular to the anchor member.

10. The wheeled audiovisual cart of claim 9 in which the attachment means is adjacent the locking means.

11. The wheeled audiovisual cart of claim 10 further comprising on each end of the safety strap a bar slide for creating a loop to adjustably cinch the safety strap to the eyelet.

12. The wheeled audiovisual cart of claim 11 in which the safety strap comprises a plurality of sub-straps.

13. The wheeled audiovisual cart of claim 12 in which at least one of the sub-straps includes a keeper for neatly retaining excess sub-strap.

14. The wheeled audiovisual cart of claim 8 in which the safety strap is a webbed structure.

15. The wheeled audiovisual cart of claim 8 in which the attachment means is configured to brace the article to be transported.

16. A support surface on a traveler cart for securely transporting and supporting articles, including:
    a guide channel recessed in the support surface for slidably receiving plural lockable anchor members positioned therein, the guide channel having an inner surface and the anchor members each having an upper surface that contacts and generally conforms to the shape of the inner surface of the guide channel;
    plural set screws respectively attached to each of the lockable anchor members and extending out of the channel for locking the upper surface of each anchor member to the inner surface of the guide channel and thereby locking the anchor members at selectable positions along the guide channel;
    plural stems respectively attached to each anchor member and extending out of the channel; and
    an eyelet on each stem to adjustably cinch thereto an end of a safety strap
    for harnessing an article to be transported.

17. The support surface of claim 16 in which each end of the safety strap includes a bar slide for creating a loop to adjustably cinch the safety strap to a respective eyelet.

18. The support surface of claim 16 in which the safety strap comprises a plurality of sub-straps.

19. The support surface of claim 18 in which at least one of the sub-straps includes a bar slide for adjusting the length of the sub-strap and a keeper for neatly retaining excess sub-strap.

* * * * *